United States Patent
Madsen et al.

(10) Patent No.: US 7,044,289 B2
(45) Date of Patent: May 16, 2006

(54) SCREW CONVEYOR FOR THE TRANSPORT OF FLOWABLE SUBSTANCES AND/OR LUMPS OF MATERIAL

(75) Inventors: Rasmus Bukh Madsen, Sorø (DK); Niels Peter Kofoed, Tøliøse (DK)

(73) Assignee: CFS Slagelse A/S, Slagelse (DK)

( * ) Notice: Subject to any disclaimer, the term of this patent is extended or adjusted under 35 U.S.C. 154(b) by 0 days.

(21) Appl. No.: 10/473,789

(22) PCT Filed: Apr. 2, 2002

(86) PCT No.: PCT/DK02/00220

§ 371 (c)(1),
(2), (4) Date: May 24, 2004

(87) PCT Pub. No.: WO02/081922

PCT Pub. Date: Oct. 17, 2002

(65) Prior Publication Data

US 2004/0238328 A1    Dec. 2, 2004

(30) Foreign Application Priority Data

Apr. 3, 2001    (EP)    ................ 01108369

(51) Int. Cl.
*B65G 33/06*    (2006.01)
(52) U.S. Cl. .............. 198/663; 198/672; 384/442
(58) Field of Classification Search ........ 198/661, 198/662, 663, 666, 667, 671, 672, 673; 384/442, 384/443, 444
See application file for complete search history.

(56) References Cited

U.S. PATENT DOCUMENTS

| 431,230 | A | * | 7/1890 | Leopold | ................ 241/82.5 |
|---|---|---|---|---|---|
| 575,141 | A | * | 1/1897 | Allen | ................ 184/25 |
| 625,400 | A | * | 5/1899 | Lambert | ................ 241/247 |
| 655,319 | A | * | 8/1900 | Wing | ................ 384/443 |
| 666,632 | A | * | 1/1901 | Bettendorf | ................ 384/442 |
| 2,038,247 | A | | 4/1936 | Stallman | |
| 2,777,403 | A | | 1/1957 | Mladek | |

(Continued)

FOREIGN PATENT DOCUMENTS

BE    519 574    5/1953

(Continued)

OTHER PUBLICATIONS

VEMAG "Forderkurvenubersicht" Nov. 1992 ["E4"].

(Continued)

*Primary Examiner*—Gene O. Crawford
*Assistant Examiner*—Rashmi Sharma
(74) *Attorney, Agent, or Firm*—Douglas E. Jackson; Stites & Harbison, PLLC

(57) ABSTRACT

A screw conveyor for the transport of flowable substances and/or lumps of material comprises a rotatable first screw (1) provided with helical windings (2) arranged in a housing (3) with an inlet opening and an outlet opening. The housing (3) comprises an inlet chamber (4) and a pumping chamber (5) between said inlet and outlet openings and at least in the pumping chamber (5) a second screw (6) is provided with helical windings (7) and arranged for rotation in the opposite direction of the first screw (1), said screws (1, 6) in said pumping chamber (5) providing a positive displacement pumping function by mutual engagement between the two screws (1, 6). By having the parts of the two screws (1, 6) in mutual engagement extending a distance corresponding to at least one half winding out of the pumping chamber (5) and into the inlet chamber (4), overfilling of the pumping chamber (5) and accordingly, the subsequent increased friction in the pumping chamber (5) is avoided.

10 Claims, 4 Drawing Sheets

U.S. PATENT DOCUMENTS

| | | | | |
|---|---|---|---|---|
| 2,992,049 | A | * | 7/1961 | Siebert et al. ............... 384/442 |
| 3,081,484 | A | | 3/1963 | Schnell |
| 3,709,571 | A | * | 1/1973 | Croisant et al. ............ 384/443 |
| 3,739,994 | A | * | 6/1973 | McFarland ................... 241/74 |
| 4,025,131 | A | * | 5/1977 | Bergquist et al. ........... 384/428 |
| 4,043,002 | A | | 8/1977 | Brackman |
| 4,057,357 | A | | 11/1977 | Daghe et al. |
| 4,153,208 | A | * | 5/1979 | Vomhof et al. ............ 241/82.4 |
| 4,220,378 | A | * | 9/1980 | Bienek ........................ 384/444 |
| 4,221,340 | A | * | 9/1980 | dos Santos .................... 241/7 |
| 4,384,643 | A | * | 5/1983 | Cone .......................... 198/672 |
| 4,422,582 | A | * | 12/1983 | Roeger et al. .............. 241/82.5 |
| 4,566,640 | A | * | 1/1986 | McFarland et al. ........... 241/74 |
| 4,704,038 | A | * | 11/1987 | Bruchon, Jr. ............... 384/443 |
| 4,815,165 | A | * | 3/1989 | Gibson ....................... 452/141 |
| 4,978,077 | A | * | 12/1990 | Huebner et al. .............. 241/30 |
| 5,186,539 | A | * | 2/1993 | Manser et al. ................ 366/85 |
| 5,205,777 | A | * | 4/1993 | Hohenester ................ 452/142 |
| 5,405,095 | A | * | 4/1995 | Lesar ....................... 241/82.5 |
| 5,953,984 | A | * | 9/1999 | Moessmer et al. ............ 99/494 |
| 6,149,083 | A | * | 11/2000 | McFarland ................. 241/82.5 |
| 6,498,917 | B1 | * | 12/2002 | Takami ....................... 399/227 |

FOREIGN PATENT DOCUMENTS

| | | |
|---|---|---|
| DE | 1 532 031 | 1/1970 |
| DE | 195 17 995 | 11/1996 |
| FR | 1.252.622 | 12/1960 |
| GB | 1065000 | 4/1967 |
| NR | 231302 | 1/1964 |
| WO | WO 98/35135 | 8/1998 |

OTHER PUBLICATIONS

VEMAG "Die ROBOT HP C-Series" 1999 ["E5"].

VEMAG Drawing of Vacuumstufer ROBOT of (E5) Mar. 9, 2000 ["E6"].

VEMAG Delivery Note Mar. 29, 2001 ["E7"].

* cited by examiner

SCREW CONVEYOR FOR THE TRANSPORT OF FLOWABLE SUBSTANCES AND/OR LUMPS OF MATERIAL

TECHNICAL FIELD

The present invention relates to a screw conveyor for the transport of flowable substances and/or lumps of material of the kind set forth in the preamble of claim 1.

BACKGROUND ART

In conveyors of this kind, it is known to reduce the friction between the walls of the pump housing, the pump screw and the material being handled by constructing the parts of the two screws in mutual engagement with an increasing pitch, i.e. increasing distance between the windings, in the pumping chamber. In this way, it is possible to handle very lumpy and very viscous materials. A construction of this kind is e.g. known from WO 98/35135.

U.S. Pat. No. 4,043,002 describes a construction in which the pumping screw may extend into the charging chamber. The purpose of this extension of the pumping screw into the charging chamber is to capture material and carry it into the pumping chamber. In connection with very lumpy and very viscous materials this may lead to increased friction in the pumping chamber due to overfilling.

DISCLOSURE OF THE INVENTION

Based on this prior art, it is an object of the present invention to provide a screw conveyor in which overfilling of the pumping chamber and accordingly, the subsequent increased friction in the pumping chamber is avoided, With this invention, the mutual engagement between the pumping screws in the inlet chamber results in a displacement of excess material out of the screws before entry into the pumping chamber, whereby overfilling of the pumping chamber and consequent increased friction in the pumping chamber is avoided.

Preferred embodiments of the screw conveyor, and the advantages thereof are explained in the following detailed description.

BRIEF DESCRIPTION OF THE DRAWINGS

In the following detailed part of the present description, the invention will be explained in more detail with reference to the exemplary embodiments of a screw conveyor according to the invention shown in the drawings, in which.

DESCRIPITON OF THE PREFERRED EMBODIMENTS

Figure 1:
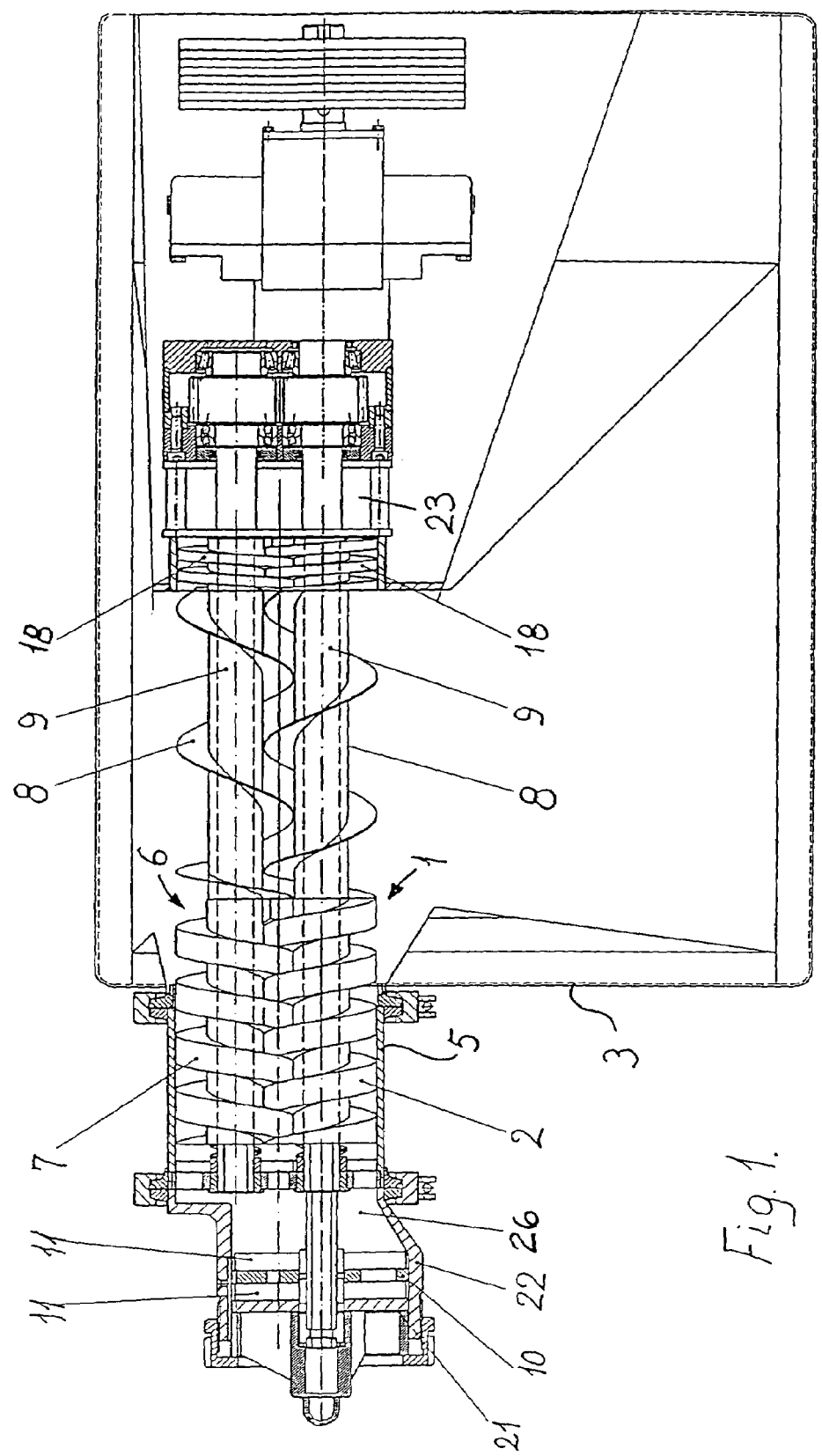
FIG. 1 shows a screw conveyor seen from above with parts cut away.
Figure 2:
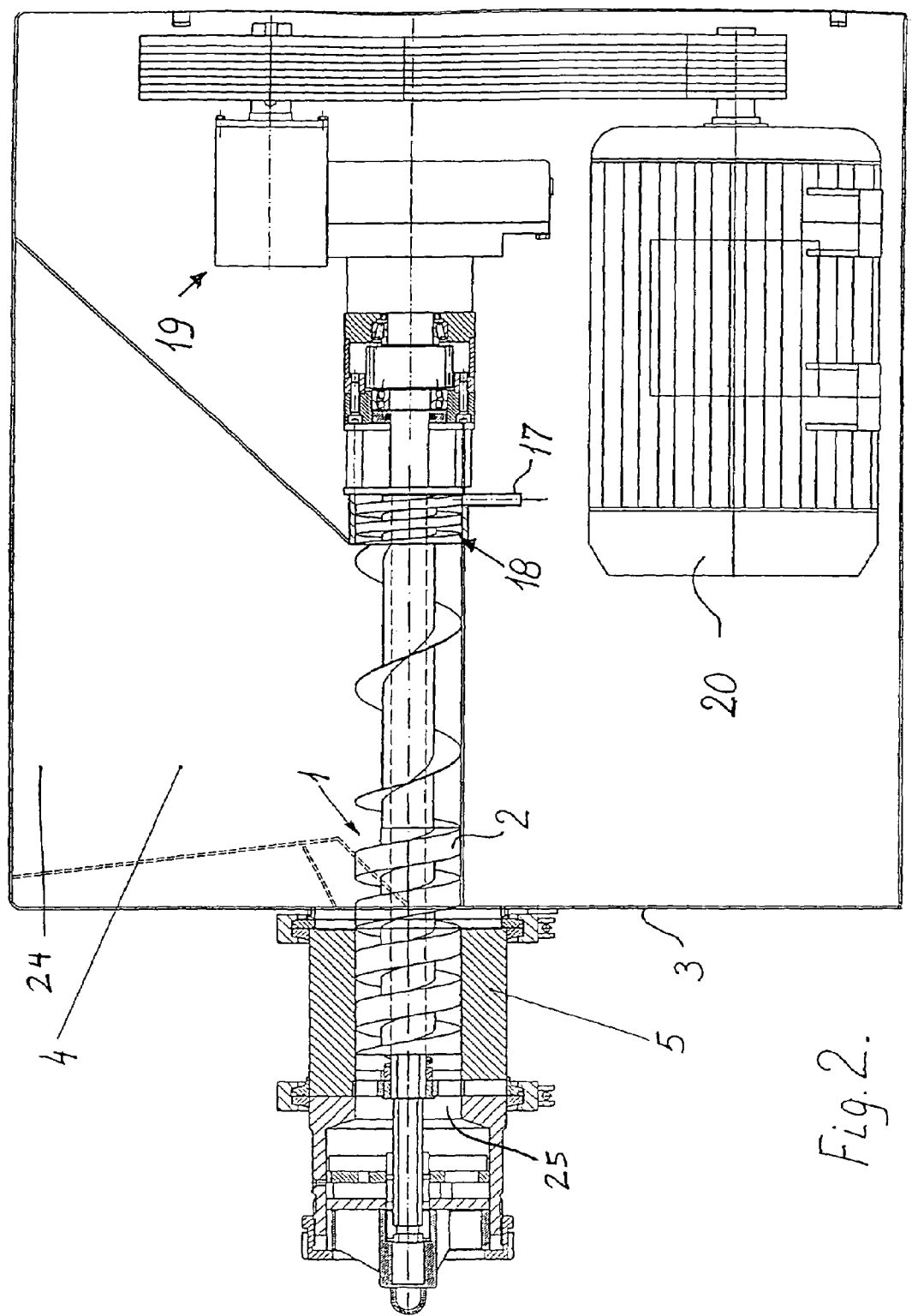
FIG. 2 shows a cross-section in the screw conveyor in FIG. 1 seen from the side.

The apparatus shown in FIGS. 1 and 2 is a meat-mincing machine incorporating a screw conveyor in accordance with the present invention. This apparatus comprises an inlet chamber 4 into which the material to be handled is introduced through an inlet opening 24, and in the bottom of which two transport screws 8 are mounted to move the material towards a set of pumping screws 1,6 provided with inter-engaging helical windings 2,7. The pumping screws 1,6 are mounted in a pumping chamber 5, whereby said screws 1,6 and pumping chamber 5 provides a positive displacement pumping function by the mutual engagement between the two screws 1,6 inside the pumping chamber 5. The first screw 1, the second screw 6 and the transport screws 8 are mounted on common axles 9 for rotation by the drive gear 19 driven by a drive motor 20. The axles 9 are rotated in opposite directions and so are the screws 1,6,8 mounted on the axles 9. As can be seen in FIGS. 1 and 2, the pumping screws 1,6 extend approximately one and a half winding out of the pumping chamber 5 and into the inlet chamber 4. By this feature it is secured that the pumping chamber 5 is not overfilled with material due to the fact that the mutual engagement 29 between the two screws 1,6 in the inlet chamber 4 will remove superfluous material from the screws 1,6. It is suggested that approximately one half winding of the mutual engaging screws 1,6 inside the inlet chamber 4 will be sufficient to avoid overfilling of the pumping chamber 5.

A vacuum connection 17 is provided at the upstream end of the transport screws 8, said connection comprising a twin-screw pump 18 providing a pumping function for pumping material sucked towards the vacuum connection 17 back into the inlet chamber 4. This vacuum facility will improve down feed of the material into the screw and ensure the filling of the pump chamber. Furthermore, it will facilitate removal of air from the material in the feed screws 1, 6. If the whole inlet chamber is to be under vacuum, it will naturally be necessary to have a lid on top of the inlet opening 24 of the inlet chamber 4 in order to vacuumize the material inside this inlet chamber 4.

In the embodiment shown in FIGS. 1 and 2, a cutting device 22 comprising a perforated disc 10 co-operating with sets of rotating knives 11 is provided, the rotating knives 11 being rotated by the axle 9 for rotating the first screw 1 and the corresponding transport screw 8. The outlet opening 25 from the pumping chamber 5 is connected to this cutting device by a relatively small volume channel 26 in order to reduce the amount of material left inside this volume when stopping the machine for cleaning/changing handled material.

Figure 3:
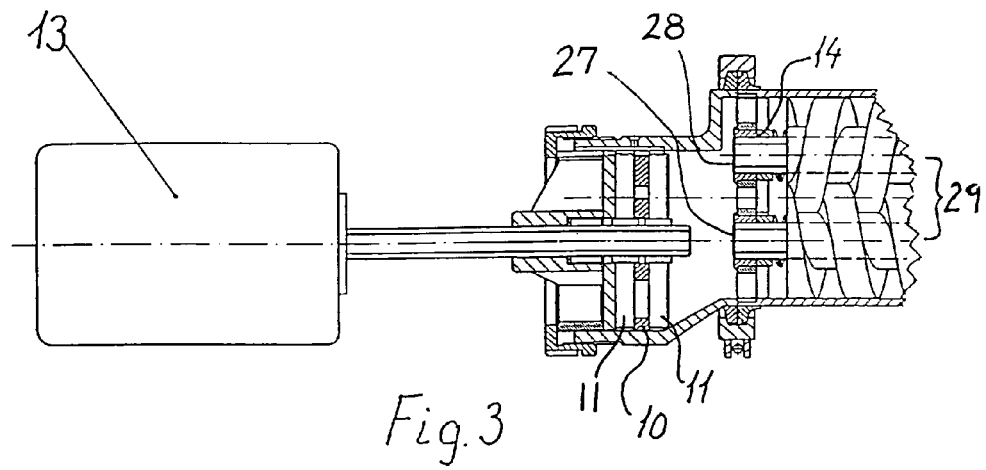
FIG. 3 shows part of the screw conveyor of FIG. 1 provided with a separate drive for the cutting device.

FIG. 3 shows an alternative cutting device, in which the rotating knives 11 are rotated by a separate drive 13. This provides a possibility of driving the pumping screws 1,6 independently of the rotating knives 11, whereby the rotational speeds of these elements can be controlled individually, e.g. in dependence of a measured pressure in the material in front of the cutting device, e.g. the higher pressure, the higher rotational speed of the rotating knives. Furthermore, a low speed of the knives will perform a non-smear cool clean cut minced meat, whereas high speed of the knives will perform an emulsion. Thus, the function of the machine can be changed by changing knife speed.

Figures 4, 4A:
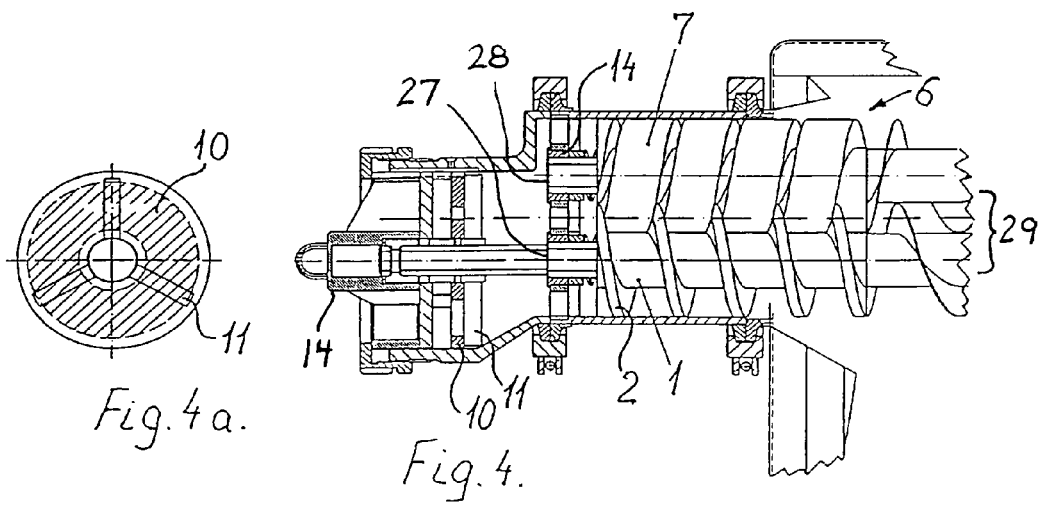
FIG. 4 shows an alternative construction of the helical windings on the pumping screws.
FIG. 4a shows the cutting device provided downstream of the pumping chamber in the embodiments in accordance with FIGS. 1–4, FIGS. 5 and 5a show an alternative cutting device comprising two sets of knives and a "figure-of-eight" shaped perforated disc.

FIG. 4 shows an alternative embodiment of the pumping screws 1,6, in which the first screw 1 comprises relatively thin helical windings 2 and the second screw 6 comprises relatively thick helical windings 7, whereby material is predominantly transported by the first screw 1. In the embodiment shown in FIG. 4, a cutting device similar to the one shown in FIGS. 1 and 2 is driven by the axle 9 for the first screw 1 and accordingly the main stream of material out of the pumping housing 3 is delivered in line with the cutting device.

Figures 5, 5A:
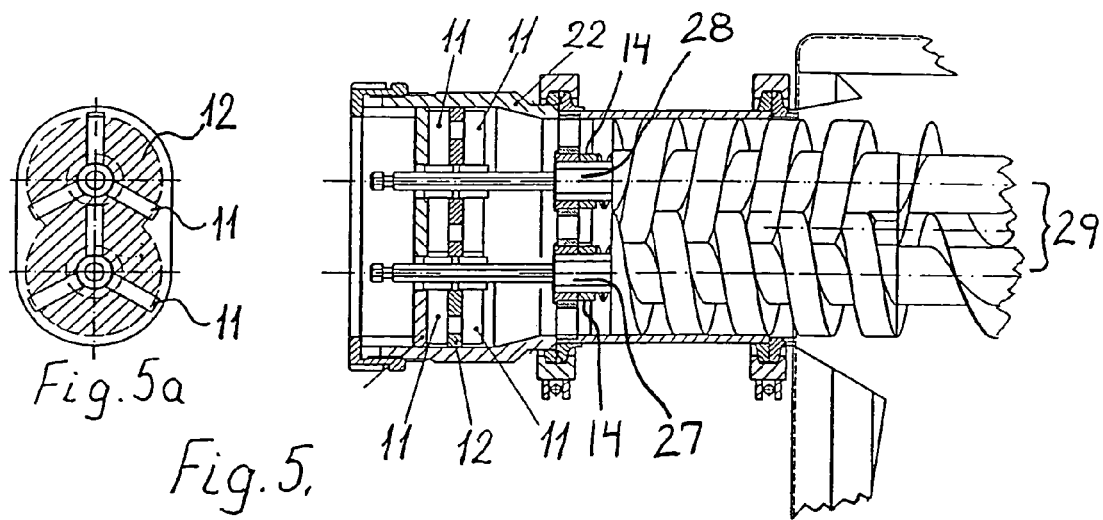

As an alternative, as shown in FIG. 5, the first screw 1 and second screw 2 are provided with substantially identical helical windings 2, 7. This provides a mainly equal delivery of material from the two screws 1,6. Accordingly, a cutting device comprising a double-perforated disc 12 of a "figure-of-eight" shape is provided and the corresponding rotating knives 11 are rotated by the axles 9 for rotating the screws 1,6, thus rotating in opposite directions and in mutual "engagement".

As can be seen from the drawings, the apparatus is of a modular construction comprising separate exchangeable components, i.e. cutting device 10, 11 mounted in a corresponding housing and connected to the pumping chamber 5 by means of corresponding mounting fittings, pumping chamber 5 containing pumping screws 1,6 and mounted on the housing 3 by means of corresponding fittings, the pumping screws 1,6, transport screws 8 and twin-screw pump for the vacuum connection 18 being mounted on the axles 9 to be rotated thereby.

Figure 6:
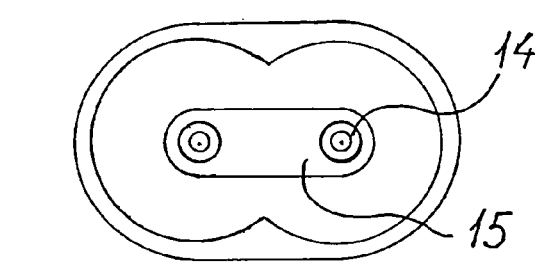
FIG. 6 shows a bearing construction for the downstream ends of the screws comprising a first connecting rod.

FIG. 6 shows a bearing construction for the downstream ends 27, 28 of the pumping screws 1,6, said bearing construction comprising pilot bearings 14 for said screws 1,6 or the corresponding axles 9 and a first rod connection 15 between said bearings 14 providing a fixation of the ends of the two screws 1,6 relative to one another (i.e., a floating connection), thereby primarily providing a bearing counteracting the tendency of those two screws to move away from one another due to the displacement of the material inside the pumping chamber 5 provided by the mutual engagement 29 between the two screws 1,6. This bearing construction primarily reduces the wear on the outwards sides of the pumping chamber 5 which would otherwise have to withstand the above-mentioned tendency of pressing the two screws 1,6 away from one another.

Figure 7:
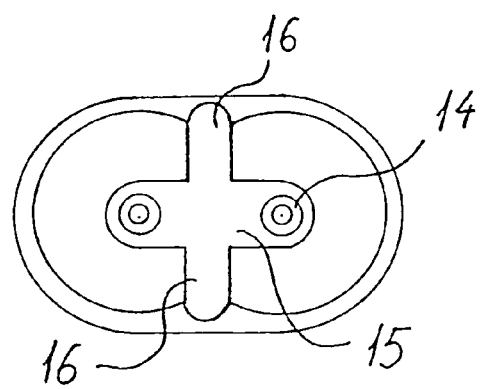
FIG. 7 shows the bearing construction in FIG. 6, but provided with a supplementary second rod connection providing a connection between the bearings and the pumping chamber.

In FIG. 7, the bearing construction in FIG. 6 is supplemented by a second rod connection 16 connecting the first rod connection 15 to the pumping chamber 5, whereby the fixation of the two screws 1,6 relative to the pumping chamber 5 is provided, said fixation primarily lifting the screws 6, 1 away from the walls of the pumping chamber 5. This is a prerequisite for avoiding metal to metal contact.

As can be seen from FIGS. 6 and 7, the rod connections 15,16 are primarily positioned in the area of mutual engagement between the two pumping screws 1,6, in which substantially no flow of material out of the pumping chamber 5 is present. In this way, the bearing construction will substantially not interfere with the flow of material out of the pumping chamber 5.

In the embodiment shown, an interspace 23 is provided between the drive gear 19 and the screws 18,8,6,1 where product is present, thereby providing a secure separation between product and gear oil preventing mutual mixing/contamination thereof.

Above, the present invention has been explained in connection with preferred embodiments relating to a meat-mincing machine, which is specially suited for mincing frozen or partially frozen meat containing lumps of material to be transported by the pumping screws 1,6. In this connection, the extension of the pumping screws 1,6 into the inlet chamber 4 provides a displacement of material out from the helical windings 2,7 on the two screws 1,6, thereby avoiding overfilling of the pumping chamber 5. However, the present invention is not restricted to such meat-mincing machine but could be used in other constructions, in which flowable substances and/or lumps of material are to be pumped by a positive displacement pumping function and in which similar problems are met.

What is claimed is:

1. Screw conveyor for the transport of flowable substances and/or lumps of material, comprising:
    a rotatable first screw provided with helical windings and arranged in a housing with an inlet opening and an outlet opening, said housing comprising an inlet chamber and a pumping chamber between said inlet and outlet openings,
    a second screw provided with helical windings and arranged for rotation in an opposite direction of the first screw, said first and second screws inside the pumping chamber providing a positive displacement pumping function by close-fitting engagement between flights and grooves of the first and second screws and between the flights of the first and second screws and a wall of the pumping chamber,
    two transport screws in the inlet chamber mounted on common axles with the first and second screws, wherein a transition between the first and second screws and the two transport screws is positioned such that at least one half winding of the first and second screws extends out of the pumping chamber and into the inlet chamber, and
    wherein the first and second screws have a constant pitch, and
    wherein downstream ends of the first and second screws are mounted in bearings, said bearings being fixed relative to one another by a first rod connection between the bearings forming a floating connection.

2. Screw conveyor in accordance with claim 1, further comprising a cutting device downstream of the pumping chamber.

3. Screw conveyor in accordance with claim 2, wherein said cutting device comprises at least one perforated disc cooperating with at least one set of rotating knives.

4. Screw conveyor in accordance with claim 3, wherein there are two sets of rotating knives each set being rotated by a respective common axle of the first and second screws.

5. Screw conveyor in accordance with claim 3, wherein rotating knives of the set are rotated by a separate driving mechanism.

6. Screw conveyor in accordance with claim 5, wherein a rotational speed of the rotating knives and the first and second screws are individually controlled.

7. Screw conveyor in accordance with claim 6, wherein the rotational speed of the rotating knives are individually controlled in dependence of a measured pressure in the material upstream of the cutting device.

8. Screw conveyor in accordance with claim 1, further comprising a second rod connection providing a connection (a) between the first rod connection provided between the bearings and (b) the pumping chamber.

9. Screw conveyor in accordance with claim 8, wherein the second rod connection is positioned in line with an area of mutual engagement between the first and second screws.

10. Screw conveyor in accordance with claim 3, wherein the downstream ends of the first and second screws are mounted in bearings in the perforated disc and/or a pilot bearing.

* * * * *